Jan. 25, 1966    E. G. KIHLSTROM ET AL    3,230,810
ATTACHMENT FOR MATERIAL WORKING MACHINE
Filed Jan. 11, 1962    9 Sheets-Sheet 1

INVENTORS:
ERIC G. KIHLSTROM
JOHN H. F. LARSSON
SVEN OBERG
BY
*Mayell, Johnston, Cook + Root*
ATT'YS

INVENTORS:
ERIC G. KIHLSTROM
JOHN H. F. LARSSON
SVEN OBERG
BY
Marzall, Johnston, Cook + Root
ATT'YS Jan. 25, 1966  E. G. KIHLSTROM ET AL  3,230,810
ATTACHMENT FOR MATERIAL WORKING MACHINE
Filed Jan. 11, 1962  9 Sheets-Sheet 4

INVENTORS:
ERIC G. KIHLSTROM
JOHN H. F. LARSSON
SVEN OBERG
BY *Margall, Johnston, Cook & Root*

ATT'YS

INVENTORS:
ERIC G. KIHLSTROM
JOHN H. F. LARSSON
SVEN OBERG
BY
Mazall Johnston, Cook & Root
ATT'YS Jan. 25, 1966   E. G. KIHLSTROM ET AL   3,230,810
ATTACHMENT FOR MATERIAL WORKING MACHINE
Filed Jan. 11, 1962   9 Sheets-Sheet 7

INVENTORS:
ERIC G. KIHLSTROM
JOHN H. F. LARSSON
SVEN OBERG
BY
Mayall, Johnston, Cook & Root
ATT'YS

Jan. 25, 1966   E. G. KIHLSTROM ET AL   3,230,810
ATTACHMENT FOR MATERIAL WORKING MACHINE
Filed Jan. 11, 1962                             9 Sheets-Sheet 8

INVENTORS:
ERIC G. KIHLSTROM
JOHN H. F. LARSSON
SVEN OBERG
BY Mazall, Johnston, Cook & Root
ATT'YS Jan. 25, 1966   E. G. KIHLSTROM ET AL   3,230,810
ATTACHMENT FOR MATERIAL WORKING MACHINE
Filed Jan. 11, 1962

INVENTORS:
ERIC G. KIHLSTROM
JOHN H. F. LARSSON
SVEN OBERG

ATT'YS

United States Patent Office 3,230,810
Patented Jan. 25, 1966

3,230,810
ATTACHMENT FOR MATERIAL WORKING
MACHINE
Eric G. Kihlstrom, Lincolnwood, and John H. F. Larsson, Schiller Park, Ill., and Sven Oberg, Gothenburg, Sweden, assignors to Pullmax Aktiebolag, Gothenburg, Sweden, a corporation of Sweden
Filed Jan. 11, 1962, Ser. No. 165,507
8 Claims. (Cl. 83—410)

This invention relates in general to material working machines, and more particularly to attachments and improvements for material working machines, and still more particularly to machines for cutting and forming of materials, although other uses and purposes may be apparent to one skilled in the art.

The attachments of the present invention may be mounted on a machine when it is manufactured, or may be mounted on machines presently in existence. While these machines are principally metal working machines for carrying on such operations as shearing, design cutting, beating, joggling, dishing, louvering, flanging and nibbling, they may be used to work other materials when functioning to cut materials and especially when functioning to produce a nibbling operation. For example, plastic or other similar materials may be worked when a machine is performing a nibbling operation. Still further, the attachments of the present invention are employed on these material working machines when it is desired to have controlled or regulated working of a material, such as when copying a template to provide a particular design or when creating a specific design for an item of manufacture.

The attachments of the present invention are employed in combination with a machine having a material working tool, and carriage means for supporting a blank of material to be worked and for providing two-directional movement of the blank relative to the tool. The carriage means includes a first carriage mounted on a slide rail means so that the carriage may move in a rectilinear path along a first axis, and a second carriage slidably mounted on the first carriage and movable in a rectilinear path along a second axis normal to the first axis. The blank of material to be worked is mounted on the second carriage, and guide means is also adjustably carried on the second carriage which coacts with an attachment of the present invention for determining the path of movement of the carriages during working of the material clamped on the second carriage. The carriage means therefore is capable of providing two-dimensional movement of the blank that may be regulated by an attachment.

One of the attachments may be defined as a dividing head that is capable of determining intricate patterns to be worked in a material blank without the use of a template, and may also be employed with a template for the usual type of copy work. Certain intricate operations are possible with the dividing head of the present invention that have not heretofore been possible with any kind of attachment. The dividing head includes a base that is adjustable along a slide rail extending parallel to the axis of movement of one carriage, a second slide rail rotatably mounted on the base, and means for coacting with the guide means adjustably slidable along the second slide rail. The dividing head is capable of defining regulated movement of the second carriage which supports the blank relative to the material working tool, including but not limited to defining measured circular and rectilinear movements of a blank.

Another embodiment of the invention is an attachment that may be defined as a circle cutting attachment wherein it is primarily useful in cutting circles in blanks and is mounted on the second carriage to drive it through predetermined circular movements. This circle cutting attachment can be used to cut circles as could the dividing head attachment and may even be used in combination with the dividing head attachment to cut circles at predetermined positions on a blank. The circle cutting attachment includes a hollow shaft rotatably supported on the second carriage and having an elongated bar adjustably mounted at the lower end of the shaft for movement along a horizontal plane. Means is provided on the end of the elongated bar in the form of a pin which is adapted to be received in a socket on a frame member or the dividing head attachment. Further, the elongated bar is graduated and an indicator is provided on the hollow shaft to determine the positioning of the axis of rotation of the shaft relative to the pin. A set screw means extends through the hollow shaft and serves to lock the shaft along the elongated bar, and a handle is arranged at the upper end of the set screw means for controlling the operation of the set screw means and for ultimately rotating the hollow shaft to drive the first and second carriage through a circular movement.

It is therefore an object of this invention to provide an attachment for a material working machine which is capable of providing regulated movement of the material to be worked by the machine.

Another object of this invention is in the provision of an attachment for use with a material working machine having a material working tool and carriage means for supporting a blank of material to be worked capable of two-dimensional movement relative to the material working tool, wherein the attachment serves to regulate the two-dimensional movement of the carriage.

A further object of this invention resides in the provision of an attachment for a metal working machine having a metal working tool, wherein the attachment is capable of imparting to a blank supporting carriage capable of two-dimensional movement, a predetermined and measured path of movement to permit cutting of a usable intricately designed item from the blank.

Another object of this invention is to provide an attachment for a metal working machine that is capable of determining intricate patterns to be made in a metal blank without the use of a template, while also being capable of being used in connection with a template for copy work.

A still further object of this invention resides in the provision of an attachment for a metal working machine that is capable of determining a metal working pattern wherein any circular or rectilinear path of metal working may be obtained.

A further object of this invention is to provide an attachment for a nibbling machine wherein template work can be accomplished and wherein the template may be positioned at any particular angle in copy work for cutting in a metal blank so that a greater number of articles may be cut from a single blank thereby eliminating wastage of material.

A still further object of this invention is to provide a dividing head attachment for use with metal cutting machines and particularly nibbling machines, wherein a new design may be cut in a blank without the use of a template.

A further object of this invention is to provide an improved circle cutting attachment for use with a metal working machine such as nibbling machines.

A still further object of this invention resides in the provision of a circle cutting attachment that may be used in connection with the aforementioned dividing head attachment in providing intricate designs in metal cutting operations.

Another object of this invention is to provide an improved circle cutting attachment that is capable of applying greater leverage to a carriage system having two-dimensional movement in cutting circles in blanks supported by the carriage.

A further feature of this invention is in providing means for floatingly or resiliently mounting a blank that is being subjected to metal cutting operations to eliminate binding between the cutting tool and the carriage that supports the blank, thereby permitting easier feed of the blank to the cutting tool and cutting patterns.

Other objects, features and advantages of the invention will be apparent from the following detailed disclosure, taken in conjunction with the accompanying sheets of drawings, wherein like reference numerals refer to like parts, in which.

Referring now to the drawings and particularly to FIGS. 1, 8, 9, and 10, a material working machine of the type on which the attachments of the present invention may be mounted is generally designated by the numeral 30 and includes generally a frame 31 having a material working tool 32 mounted thereon. A carriage arrangement 33 is mounted on the frame and includes a first or lower carriage 34 and a second or upper carriage 35 for imparting two-dimensional movement to a blank relative to the material working tool 32. A dividing head attachment 36 according to the present invention is suitably mounted on the frame 31 of the machine and serves to regulate the two-dimensional movement of the blank relative to the tool for forming intricate designs in the blank.

The frame 31 includes a lower base section 37 suitably supported on standards 38 in elevated relation above the floor, an upper cantileverly supported section 39 opposing the lower base 37 and connected thereto by means of an intermediate section 40 at the back of the machine, thereby defining a throat or working area 41.

Figure 2:
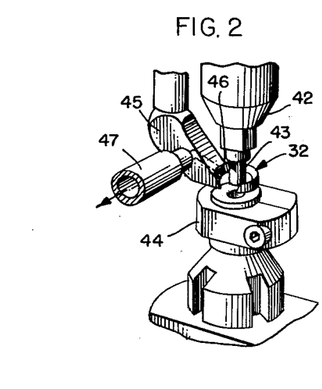
FIG. 2 is an enlarged detail perspective view of the cutting tool and its associated elements.
Figure 3:
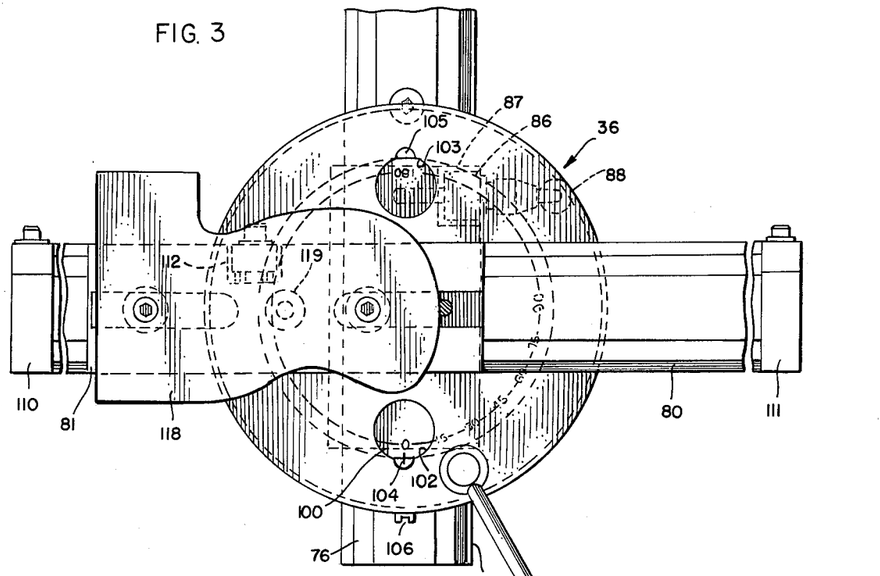
FIG. 3 is a top plan view taken substantially along line 3—3 of FIG. 1 of the dividing head attachment of the present invention with some parts broken and other parts in phantom for purposes of clarity.

Arranged at the open end of the throat 41 is the material working tool 32 which includes, as seen in FIG. 2, a tool holder 42 carried by the upper cantilever section 39 and supporting a nibbling tool 43. A matrix 44 for the nibbling tool is supported by the lower base 37 of the frame. While a nibbling tool is illustrated and will be referred to hereinafter in describing the invention, it should be appreciated that other material working tools may be employed by the machine in the working of materials. And it has been found that the attachments of the present invention are unusually useful in connection with nibbling operations. A tool cooling and material stripping head 45 is provided in association with the tool for stripping the material from the tool during the nibbling operations and for directing a stream of cooling fluid from the aperture 46 against the tool 43. Cooling fluid may be supplied to the head through the line 47.

The tool holder 42 is reciprocally mounted in the upper cantilever section 39, and reciprocally driven by suitable mechanism and a suitable power source in a manner such as employed in similar machines manufactured and distributed by American Pullmax Company, Inc., of Chicago, Illinois. Moreover, the lever 48 controls the stroke of the tool and the position of the tool, such as moving the tool between cutting and non-cutting position as is necessary during insertion of a sheet of material in the machine.

The carriage arrangement or assembly 33 which includes the first and second carriages 34 and 35 may be easily mounted on a machine that is in existence without altering the machine, or may be mounted on a machine during its manufacture. This arrangement includes an elongated, channel-shaped base 49 arranged in the throat 41 of the frame and is supported on and secured to the lower base 37 of the frame. The channel-shaped base 49 comprises a horizontal section 50 resting on the lower base section 37 of the frame and secured thereto by a pair of fasteners 51, 51, downwardly depending opposed sections 52, 52 that extend substantially perpendicular to the horizontal section 50, and outwardly projecting horizontal extensions 53, 53 at the lower ends of the sections 52. Mounted on the extensions 53 are slide rails 54, 54 which extend parallel to each other and parallel to the long axis of the throat 41. The first or lower carriage 34 is mounted on the slide rails 54 for movement parallel to the long axis of the throat between the front and back of the machine. Stops 55 are mounted on the opposite ends of the rails 54 to prevent the carriage 34 from sliding off the rails. Additionally, collars 56 may be provided on one of the rails, FIG. 9, for adjustable mounting therealong and to define a measured, limited travel of the lower carriage along the rails 54. Locking means 57 is mounted on the lower carriage 34 for selectively locking the lower carriage at any position along the slide rails.

A pair of parallel slide rails 58 are mounted on the lower carriage 34 and extend perpendicular to the rails 54. The upper carriage 35 is slidable along the rails 58. Stops 59 are secured to the opposite ends of the rails 58 to prevent the carriage 35 from sliding off the rails. Further movement of the carriage 35 along the rails 58 may be adjustably limited by the collars 60 which are carried on one of the rails. And the upper carriage 35 may be selectively fixed along the rails 58 by means of a locking device 61.

A mounting bar 62 is secured to the upper carriage 35 and extends parallel to the rails 58. The cross section of this mounting bar is dovetail in shape as can be seen most clearly in FIG. 11. One or more blank clamps 63 may be supported by the mounting bar 62 for mounting the blank on the upper carriage 35. Each blank clamp 63 includes a clamp portion 64 resiliently supported on a base 65. The base 65 is formed to be received on the dovetail mounting bar 62 and is provided with a locking device including a movable section 66 and a handle-operated bolt 67 for drawing the movable section 66 toward the stationary section and against the mounting bar 62, FIG. 1. Thus, the blank clamp 63 may be adjustably positioned anywhere along the mounting bar 62. Axially aligned pins 68 are carried on the clamp portion 64 and slidably mate with sockets 69, FIG. 11, in the base 65. Springs 70 are positioned between the base 65 and the clamp portion 64 and in encircling relation with the pins 68, thereby resiliently mounting the clamp portion 64 on the upper carriage 35. The clamp portion 64 has mounted therein a lower threadedly adjusted jaw 71 and an upper threadedly adjusted jaw 72 in alignment with the lower jaw arranged to clamp therebetween a blank 73. A handle 74 is secured to the upper end of the upper jaw 72 to facilitate clamping action. The upper jaw 72 includes a blank engaging member 75 having a ball joint connection with the jaw for the purpose of providing a better gripping action of the blank by the clamp. In resiliently mounting the clamp portion 64 to the upper carriage, the blank 73 is thereby resiliently or floatingly supported by the upper carriage to eliminate binding between the nibbling tool and the material thereby permitting easier feed of the material to the nibbling tool in cutting various patterns in a blank.

It is now seen that the blank, being mounted on the upper carriage 35, may be moved two-dimensionally relative to the nibbling tool. As above explained, the attachment 36 is provided to control the two-dimensional movement of the blank in order to define cutting patterns for intricate designs.

It should be further appreciated that the carriage assembly 33 may be mounted outside of the throat 41, in which case the slide rails 54 may or may not be lengthened. Any suitable frame or supporting structure may be provided to support the carriage assembly outside of the throat and in essence displaced from the position disclosed herein along the long axis to the outer boundaries of the machine. Such an arrangement could increase the capacity of the machine and could serve to handle special functions.

Referring now to FIGS. 1–10, the dividing head attachment 36 is adjustably mounted along a slide bar 76 that extends parallel to the long axis of the machine throat and the slide rails 54. The slide bar 76 is mounted on a pair of L-shaped angle bars 77, 77 that extend laterally of the lower base section 37 of the machine frame. Spacer members 78 are provided between the angle bars 77 and the extensions 53 of the carriage base 49 to further support the carriage base relative to the frame of the machine, and the spacers are held in place by means of fasteners 79.

The dividing head attachment 36 includes an upper dovetail-shaped slide track 80 having adjustably mounted therealong a template carrier and guide means socket 81, a circular track member 82 that is secured to a slide 83 carried on the slide bar 76, a circular guide 84 coacting with the circular track member 82, and a retaining plate 85 for maintaining the circular guide and track member in coacting relationship and to which is secured the slide track 80. As seen particularly in FIGS. 3 and 4, a separated locking section 86 is carried by the slide 83 and selectively forced against the dovetail track 76 by means of a locking bolt 87 having a handle 88 to thereby lock the dividing head attachment along the slide bar 76.

The circular track member 82 is secured to the slide 83 by cap screws 89, and the outer periphery of the track member 82 is provided with a beveled surface 90 that mates with in sliding relation an opposed beveled surface 91 on the circular guide 84. And with the circular guide 84 being secured to the retaining plate 85 and the slide track 80, it can be seen that the slide track 80 may be rotationally adjusted with respect to the slide bar 76.

In order to lock the slide track 80 at any angular position with respect to the slide bar 76, a locking nut 92 is provided and received in a slot extending through the ring-shaped circular guide 84. A beveled surface 93 is provided on the locking nut 92 for engagement with the beveled surface 90 on the circular track member 82. A locking bolt 94 extends through a hole 95 in the retaining plate 85 and threadedly engages the nut 92. A handle 96 is secured to the bolt 94 to facilitate operation of the bolt in tightening and loosening of the locking nut 92 with respect to the circular track member 82. When the locking bolt 94 has been rotated to drive the locking nut 92 into engagement with the circular track member 82, the slide track 80 is then locked at that position with respect to the slide bar 76.

The retaining plate 85 includes an upper circular horizontal section 97 that is fastened to the ring guide 84 by a suitable number of fasteners 98, and is, in turn, fastened to the slide track 80. A downwardly extending flange 99 is carried on the periphery of the circular horizontal section 97 and extends downwardly along the outer periphery of the circular guide ring 84.

Measured angular displacement between the slide track 80 and the slide bar 76 is determined by a scale graduated in degrees on the circular track member 82 as indicated at 100 or by a similar scale graduated in degrees along the outer peripheral surface of the flange 99 on the retaining plate 85 as indicated at 101. A pair of circular openings 102 and 103 are formed in the horizontal section 97 of the retaining plate 85 to view the scale 100 impressed on the circular track member 82. Indicator lines 104 and 105 coact with the openings 102 and 103, respectively, for aligning with the graduations on the scale 100 when taking an angular measurement. The openings 102 and 103 are diametrically opposed and serve as observation or measuring windows, and are so arranged to permit reading of a measurement from either side of the retaining plate. Similarly, an indicator 106 is mounted on the slide 83 and not movable to coact with the scale 101 in measuring degree rotation between the slide track 80 and the slide bar 76 if the reading cannot be conventionally made from the observation windows 102 or 103.

Figure 4:
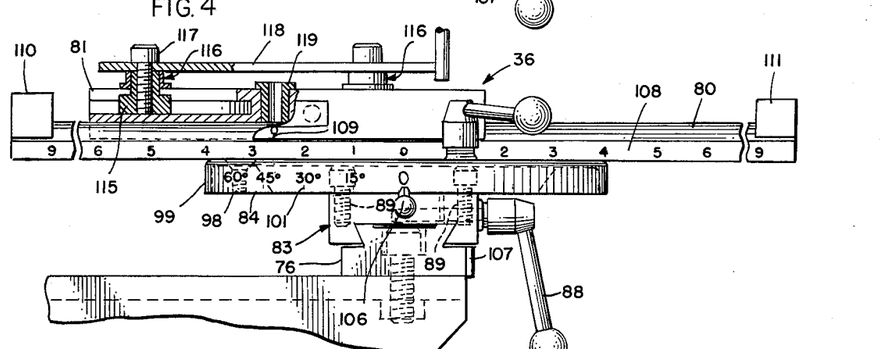
FIG. 4 is a broken front elevational view of the dividing head attachment of FIG. 3 and with some parts shown in section for purposes of clarity.
Figure 5:
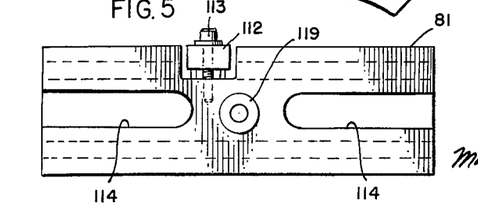
FIG. 5 is a top plan view of the upper slide on the dividing head attachment of FIGS. 3 and 4.
Figures 6, 7, 8:
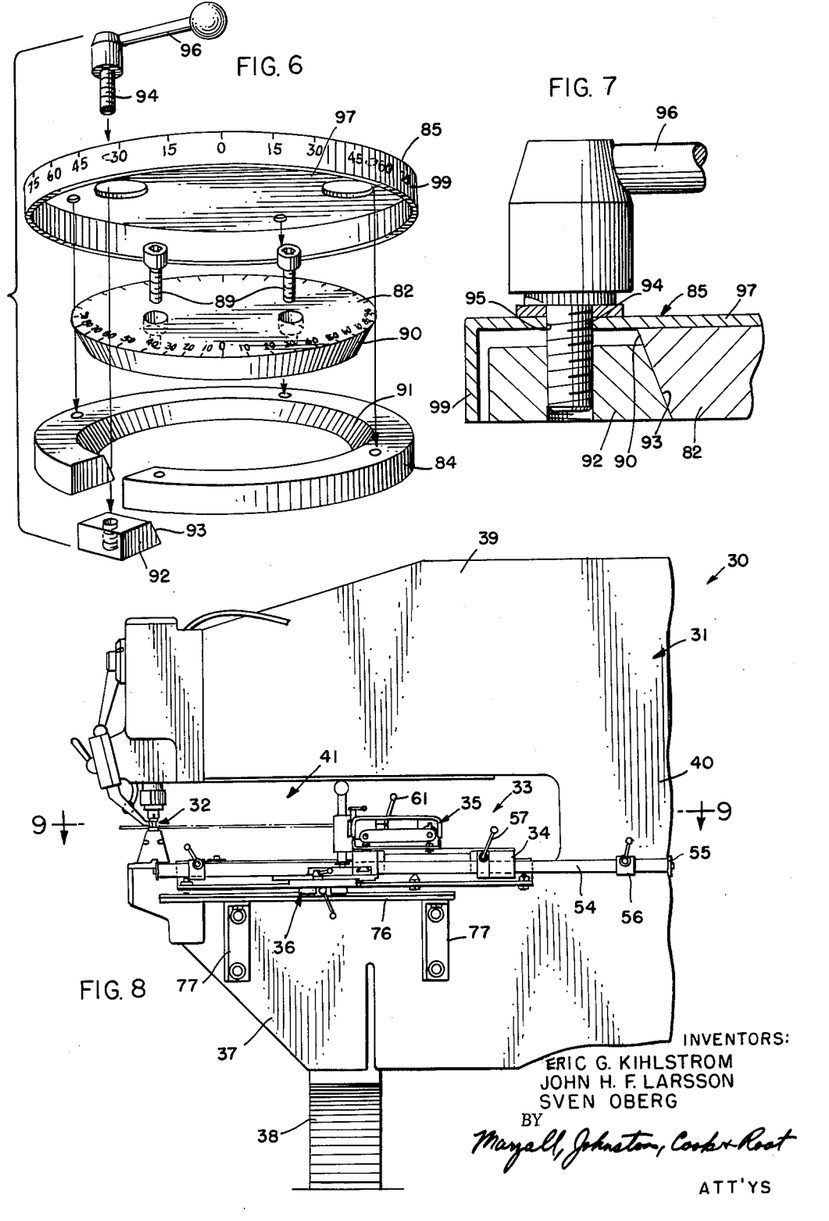
FIG. 6 is an exploded perspective view of a part of the dividing head attachment of FIGS. 3 and 4.
FIG. 7 is a fragmentary enlarged detail view taken through the locking device of the dividing head attachment.
FIG. 8 is a fragmentary side elevational view of the material working machine of FIG. 1 and illustrating the attachment of the present invention as being mounted thereon.
Figure 9:
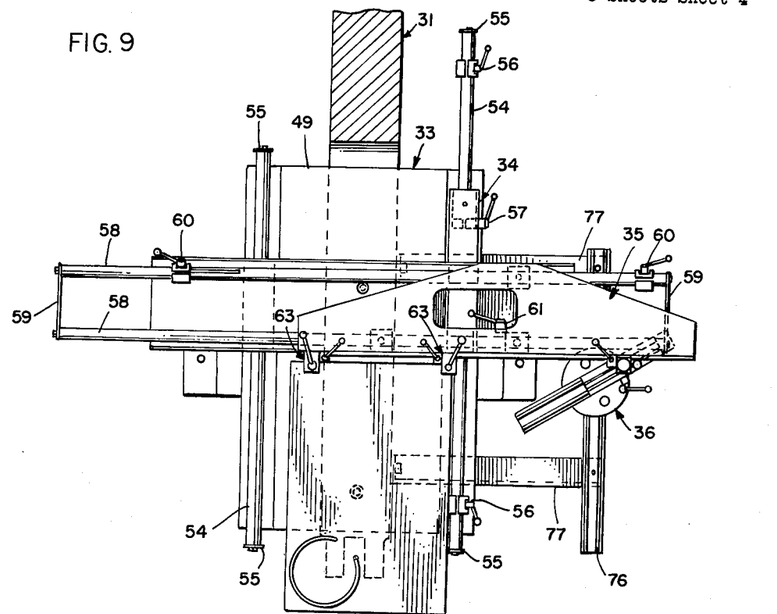
FIG. 9 is a top plan view of the attachment and the carriage arrangement of the present invention and taken substantially along line 9—9 of FIG. 8.
Figure 10:
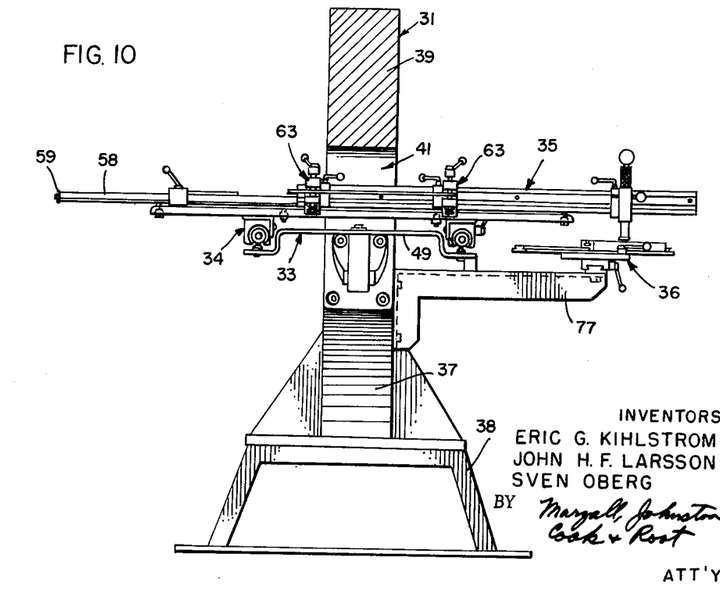
FIG. 10 is a front elevational view of the machine of FIG. 8 with some parts broken away to illustrate the carriage and attachment arrangement.

A linear measuring scale 107 is provided along the slide bar 76 for measuring movement of the dividing head therealong in the making of any particular design. Similarly, a linear measuring scale 108, FIG. 4, is provided along one edge of the slide track 80 for measurement of movement of the template carrier and guide means socket 81 therealong. A zero indication line 109 is provided on the template carrier 81 for a reference point of the carrier relative to the slide track. Similarly, a reference mark would be provided on the slide 83 for coaction with the measuring scale 107.

The slide track 80 is dovetailed in cross sectional shape and the template carrier 81 is formed to slide therealong. To set the opposite limits of movement of the template carrier 81, a pair of adjustable stops 110 and 111 are mounted on the slide track 80. And the template carrier and guide socket means 81 may be locked anywhere along the slide track 80 by a locking sector 112 which may be drawn tightly against the slide track 80 and toward the template carrier 81 by means of a wrench operable locking bolt 113. Thus, the template carrier and guide socket means may be either freely slidable along the slide track 80 or locked thereto at any position therealong by means of the locking sector 112.

A pair of T-nut receiving slots 114, 114 are formed in the template carrier and guide socket means 81 to receive T-nuts 115 of template mounts 116 and to be adjustably positioned along the slots and receive bolts 117 for securing a template 118 thereto. Inasmuch as the template mounts 116 may be adjustably positioned toward or away from each other along the template carrier 81, any variety of template hole spacings in a template may be accommodated. A guide means socket 119 is provided in the template carrier and guide socket means 81 and preferably at the center thereof as especially shown in FIGS. 3–5.

The blank supported by the upper carriage 35 is controllably moved relative the dividing head attachment 36 by a guide means 120 that is adjustably carried on the mounting bar 62. This guide means includes a base 121 formed to be slidably received along the dovetail mounting bar 62. A locking sector 122 is carried by the base 121 and tightened or loosened with respect thereto and the mounting bar 62 by means of a locking bolt 123. A handle 124 is secured to the locking bolt 123 to facilitate locking and unlocking of the base 121 of the guide means along the slide bar 62.

A linear measuring scale 125 may be mounted along the top of the carriage 35 to coact with an indicator 126 extending from the guide means base 121 to measure movement of the guide means along the carriage during the cutting of a design in a blank.

Figure 14:
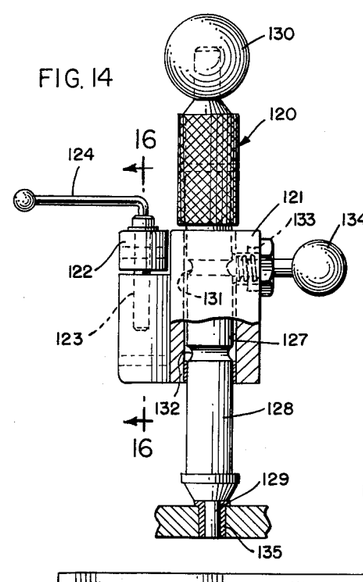
FIG. 14 is a front elevational view of the guide means.
Figure 15:
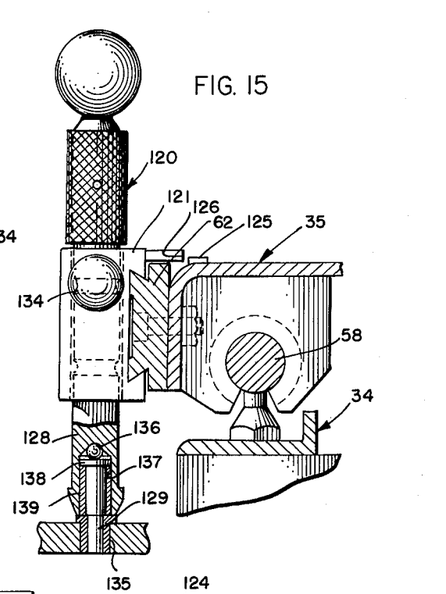
FIG. 15 is a further side elevational view of the guide means and showing it in association with a socket mounted on the frame.
Figure 16:
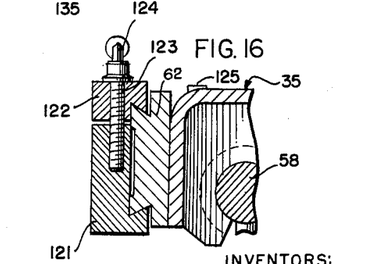
FIG. 16 is a detail sectional view of the locking means for locking the guide pin mounting means on the upper carriage and taken substantially along line 16—16 of FIG. 14.

An elongated vertical bore 127 extends through the base 121 and slidably receives therein an elongated guide pin holder 128 having a guide pin 129 rotatably mounted at its lower end. A knob and handle 130 extends above the base 121 on the holder 128 for grasping by the hand of the operator in maneuvering the carriage 35 during the tracing of a template such as the template 118 in FIGS. 3 and 4. A pair of annular slots 131 and 132 are spaced along the holder 128 and adapted to be selectively engaged by a spring biased detent 133 carried by the base 121 and movable along an axis perpendicular to the long axis of the holder 128. A handle 134 is provided at the outer end of the detent 133 for releasing the detent from either of the slots 131 or 132. With the holder positioned as shown in FIG. 14 wherein the detent engages the upper slot 131, the guide pin 129 is shown in engagement with a guide pin socket 135. In setting up the machine, the holder would be raised to the upper position so that the detent 133 would align with the slot 132 and hold the guide pin 129 out of the way for setup purposes. The socket 135 may be provided on a stationary part of the frame or may correspond to the guide pin socket 119 of the dividing head attachment 36.

In order to facilitate pivotal movement between the socket 135 and the guide means 120, the guide pin 129 is rotatably carried by the guide pin holder 128. In this regard, a ball bearing 136 is seated in the bottom of a blind bore 137 provided in the end of the guide pin holder 128. A disc-shaped head 138 is defined on the upper end of the guide pin 129 and arranged in bearing engagement with the ball bearing 126, and a sleeve bearing 139 lines the bore 137 to bearingly receive the cylindrical pin 129.

Figure 11:
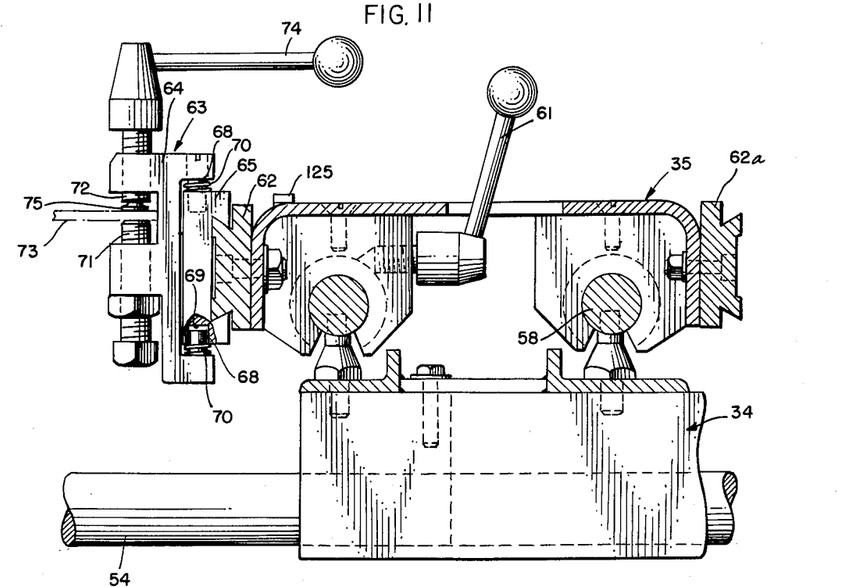
FIG. 11 is a sectional view taken through the carriage arrangement of the present invention and illustrating the means for mounting the blank to the second or upper carriage and taken substantially along line 11—11 of FIG. 1.

A second mounting bar 62a, FIG. 11, may be secured to the back side of the upper carriage 35 for mounting the guide means 120 thereon to thereby give more room for clamp positionng on the front mounting bar 62.

Figure 12:
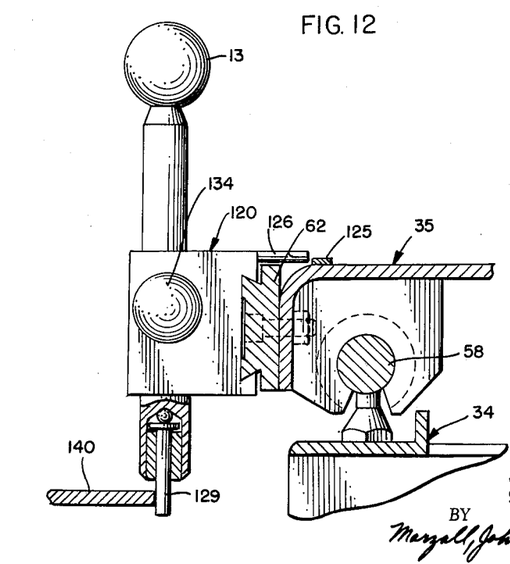
FIG. 12 is an enlarged detail elevational view, with some parts in section and other parts broken away for purposes of clarity of the guide means for use on the upper carriage and taken substantially along line 12—12 of FIG. 1 and illustrating its use in association with a template.
Figure 13:
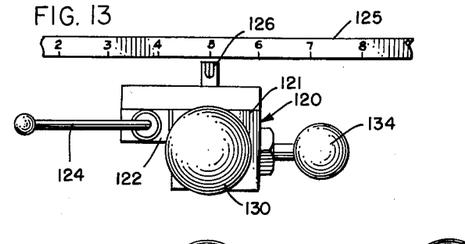
FIG. 13 is a top plan view of the guide means according to the invention and illustrating the measuring scale on the upper carriage.
Figures 25, 26:
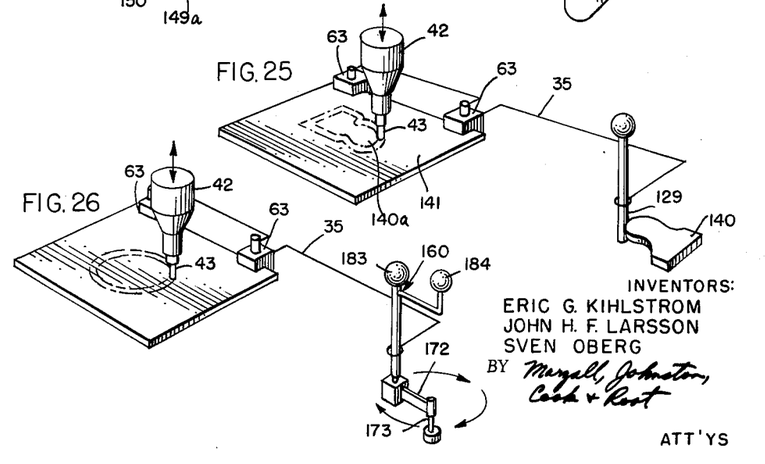
FIG. 25 illustrates diagrammatically how an item may be copied from a template by nibbling.
FIG. 26 illustrates diagrammatically how a circle cutting attachment operates to cut, by nibbling, a circle in a blank.

The guide pin 129 is shown in engagement with the periphery of a template 140 in FIG. 12, and the manner in which a template is copied is diagrammatically illustrated in FIG. 25, wherein the template 140 is traced by the guide pin 129 to drive the carriage 35 supporting a blank 141 through a path of movement relative to the nibbling tool 43 for duplicating the template 140 in producing a completed copy 140a. During the copying of a template, it will be appreciated that the carriages 34 and 35 will be freely slidable along their respective slide rails so that two-dimensional movement of the blank supported by the carriage 35 can be produced.

Figure 1:
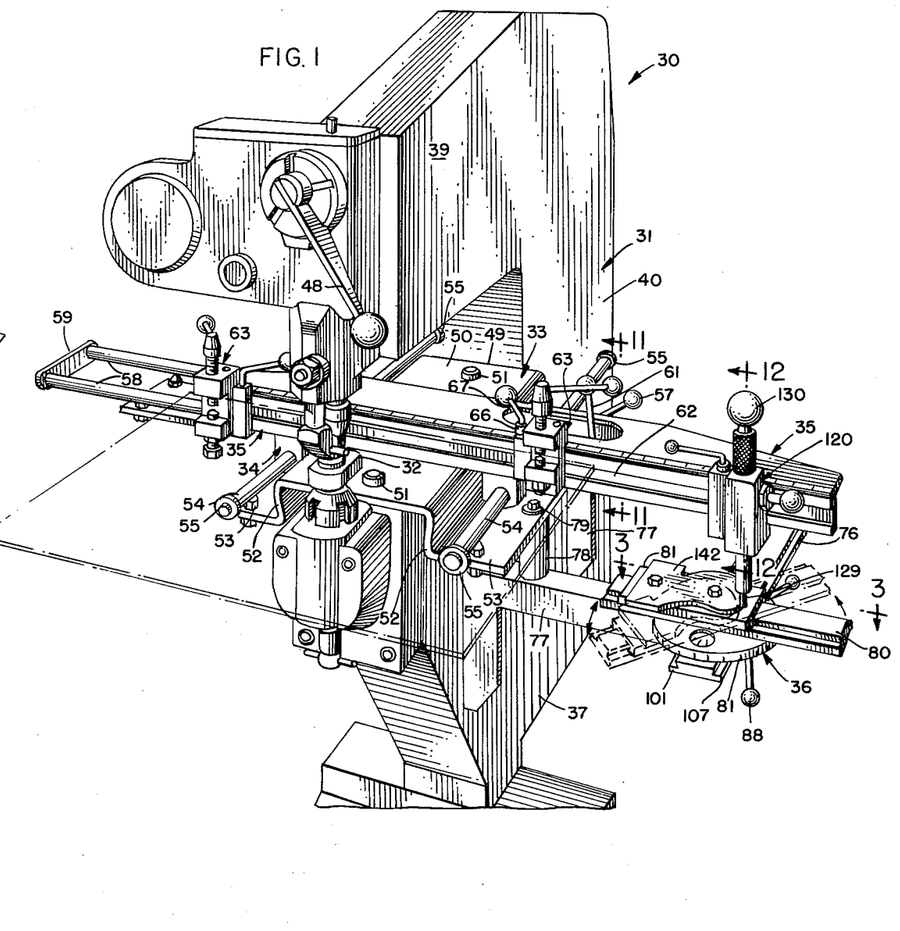
FIG. 1 is a perspective view of a material working machine having an attachment mounted thereon according to the invention, with some parts removed for purposes of clarity.
Figure 27:
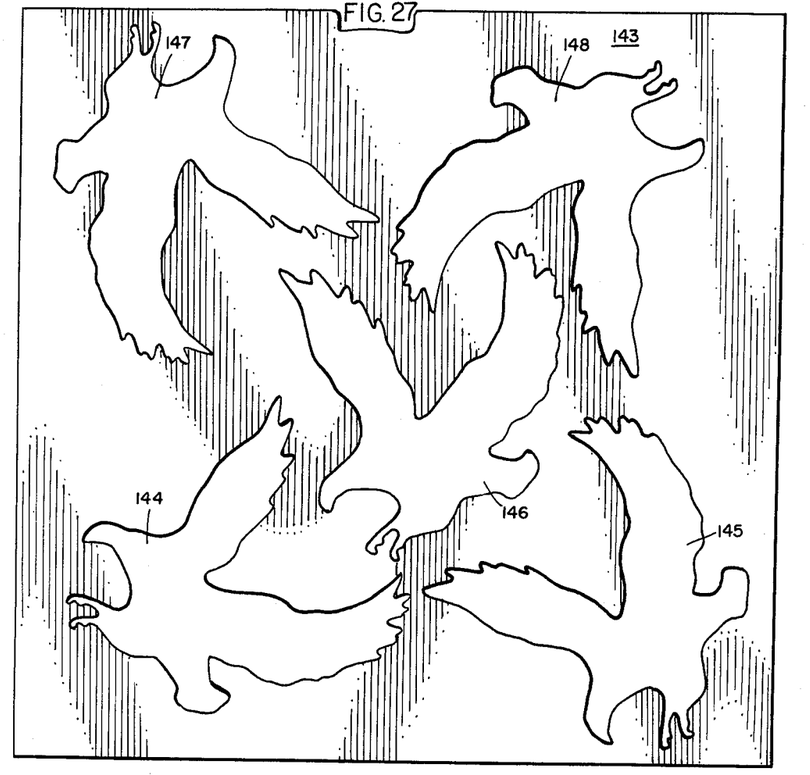
FIG. 27 is a plan view of a blank having a plurality of designs cut therein and illustrating how the designs may be positioned angularly relative to each other in such a manner as to enable a greater number of designs to be cut and thereby eliminating wastage of material, wherein the template is mounted on the dividing head attachment of the present invention for cutting of the designs.
Figure 28:
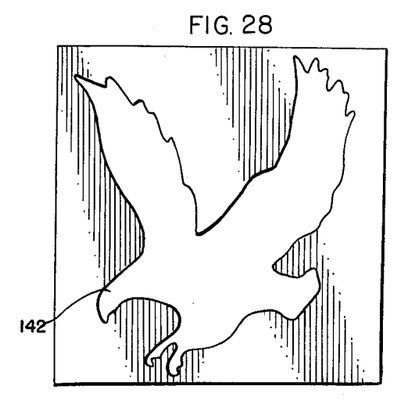
FIG. 28 illustrates how a single design may be cut from a blank according to the present invention.

In the tracing of a template such as a template of an eagle, the template would be mounted on the template carrier 81 in a manner similar to the mounting of the template 142 on the dividing head template carrier 81 as shown in FIG. 1. With the guide pin 129 in its down tracing position so that it can engage the periphery of the template, the position of the template is adjusted so that the eagle may be cut from the blank carried by the carriage 35. Then the nibbling tool is placed into cutting operation with the guide pin engaging one point along the periphery of the template, after which the handle 130 is grasped by the hand of the operator and the carriage 35 is driven through a path of movement tracing the template to define the eagle such as shown in FIG. 28 and indicated by the numeral 142. To cut the eagle on the blank in the manner shown in FIG. 28, the template carrier would be adjustably positioned along the slide track 80, the slide track 80 would be rotatably positioned about the circular track member 82 which, in turn, would be adjustably positioned along the slide bar 76. The various locking means would be operated to securely lock the template in position so that it would not move during the copying or tracing operation.

Where it would be desired to cut a number of designs such as eagles from a single blank such as the blank 143 shown in FIG. 27, the template could be initially positioned on the blank 143 in various positions before the blank is mounted on the carriage 35 to determine how the various cuts can be made in order to obtain the maximum production of eagles from a single blank, bearing in mind that the template may be positioned in any direction and thereafter copied by virtue of the dividing head attachment. For example, with the template mounted on the dividing head and the plate 143 mounted on the carriage 35, the dividing head 36 would first be set up to cut one of the eagles, and where it might be assumed that the eagle 144 may first be cut, the dividing head would be positioned along the lower slide rail 76 until the nibbling tool would cut in the forward portion of the blank 143. Then the template carrier 81 would be positioned along the slide track 80 so that the eagle would be cut in the lefthand side portion of the blank, and finally the eagle would be rotationally positioned so that it would cut as originally planned on an angle as shown in FIG. 27. To then cut the eagle 145, it would be necessary to rotationally set the template and to move the template carrier 81 along the slide track 80 so that the eagle would be cut in the front righthand section of the blank.

The eagle 146 would require a further setting of the dividing head by rotationally setting the slide track 80 relative to the slide bar 76, the setting of the template carrier 81 along the slide track 80, and the setting of the dividing head along the slide bar 76. Subsequently to cut the eagle 147, the template and slide track 80 would have to be adjustably rotated relative to the slide bar 76, and the template carrier 81 would have to be adjustably positioned along the slide track 80. Further, the dividing head 36 would be adjustably positioned along the slide bar 76. Finally, to cut the last eagle 148, it would only be necessary to reposition the template carrier 81 along the slide track 80 and to rotationally position the slide track 80 and template relative to the slide bar 76. Thus, it should be appreciated that more designs may be cut from a single blank by virtue of mounting the template on the dividing head 36.

Figure 24:
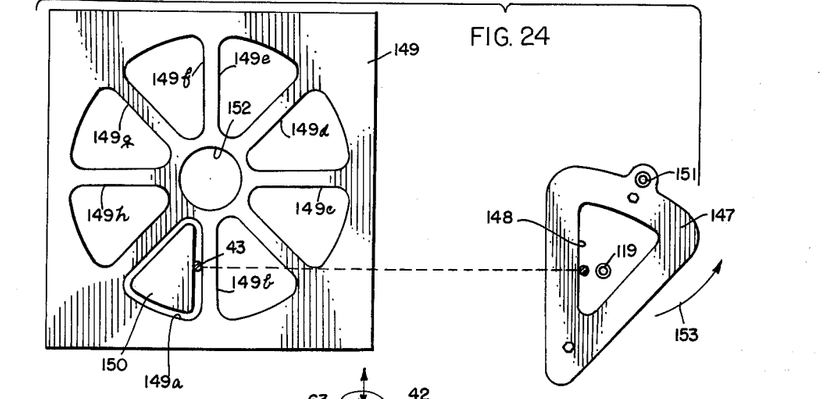
FIG. 24 discloses an unusual design that may be cut by nibbling in a blank by use of a template and by use of the dividing head attachment upon which the template may be mounted.

Another illustrated use of copying from a template, wherein the dividing head attachment 36 is necessary to define a particular pattern is illustrated in FIG. 24, wherein a template 147 is secured to the slide track 81. The template is provided with a triangularly-shaped opening 148 that is to be copied on a blank 149 by driving the blank supporting carriage 35 in a path outlined by the triangular opening 148 as detected and copied by movement of the guide pin 129 about the periphery of the opening. The nibbling tool 43 cuts the opening 149a in the blank 149 when the template 147 is positioned as shown in FIG. 24, and thereby dropping out a center piece 150 which constitutes waste. In initially positioning the template 147 on the template carrier 81, it is arranged so that rotation of the template 147 through 360° permits the tool to at all times work on the blank 149 so that the end product of circumferentially spaced openings on the blank 149 can be accomplished. The pivot point of the template 147 may be designated by the numeral 151 and which also corresponds to the center of the central opening 152 that is subsequently cut in the blank 149 as will be hereinafter explained. Inasmuch as it is desired in the cutting of the design in the blank 149 to provide eight circumferentially equally spaced openings, to determine the operation of the dividing head, this number may be divided into 360 to determine that the long axes of the triangular openings are spaced 45° apart. If only 6 openings were desired, the longitudinal axes of the openings would be 60° apart where if 12 openings were possible, the openings would be spaced 30° apart. Thus, in determining that the openings are spaced 45° apart after the opening 149a has been cut, the template 147 is rotated in a counterclockwise direction as indicated by the arrow 153 a total of 45°, after which the opening 149b is then cut. The 45° rotation may be measured either on a scale 100 or the scale 101 and accurately. Thereafter the template may again be successively rotated in the counterclockwise direction at 45° angles to successively cut the openings 149c, 149d, 149e, 149f, 149g, and 149h. The center opening 152 is not cut by using the template or a template although it could be cut by use of a template. However, it is merely cut by using the dividing head as the pattern wherein the guide pin 129 would be received in the socket 119 on the template carriage and guide pin socket means 81. By adjustably positioning the guide means 120 along the mounting bar 62 and the dividing head along the slide bar 76, the center of the opening 152 is aligned with the center of the dividing head so that the guide pin 129 coincides with the center of the dividing head attachment. The dividing head attachment is then locked in place along the slide bar 76 and the guide means 120 is locked in place along the mounting bar 62. Then the guide socket carrier 81 is moved along the slide track 80 so that the guide pin 129 is spaced from the center of the dividing head attachment a distance equal to the radius of the circular opening 152. The nibbling head 43 is then placed into cutting position with the socket carrier 81 locked in place. With the slide track 80 being free to rotate on the dividing head attachment, the slide track is rotated through 360° thereby cutting out the circular opening 152.

Figure 29:
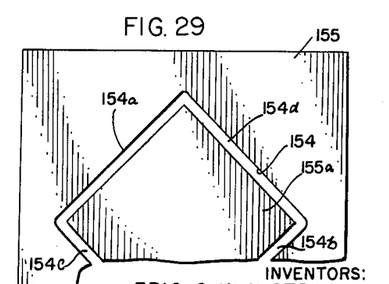
FIG. 29 illustrates still another pattern that may be cut from a blank with the dividing head attachment of the present invention.

When the dividing head is coupled to the upper carriage 35 through the guide means 120, either circular or rectilinear cuts may be made in a blank held by the carriage by controlling the two-dimensional movement of the carriage relative to the nibbling tool 43. The guide pin 129 is received in the socket 119 on the socket carrier 81 and in the generation of rectilinear cuts along a blank, it should be appreciated that the slide track 80 may be rotated to any angular position after which the socket carrier 81 by applying pressure on the handle 130 of the guide means 120 may be moved along the slide track 80 any desired distance. Or the socket carrier 81 may be positioned at any point along the slide track 80, after which the lever 48 may be operated to bring the nibbling tool into cutting position and then the socket carrier be moved along the slide track a predetermined distance. For example, in cutting a diamond-shaped opening in a blank, such as the opening 154 in the blank 155, FIG. 29. Thus, the diamond-shaped opening 154 in the blank 155 is made without the use of a template. The 0 and 180° reference points on the dividing head are aligned with the slide bar 76, and along a diagonal line or a line extending 45° relative to the transverse axis of the machine, the slide track 80 would be rotated counterclockwise until the indicator 104 aligned with the 45° marking on the scale 100, or the indicator 106 aligned with the 45° marking on the scale 101. The length of the cut may then be set or determined by the adjustable positioning of the stop blocks 110 and 111 or by the measuring of the length along the scale 108 relative to movement of the reference indicator 109. After the machine is properly set, the nibbling tool 43 may be put into cutting position and the first cut 154a made on the blank 155. Actually, the position of the slide track 80 will take the approximate position as shown in phantom in FIG. 1 to make the cut 154a. The cut 154b may also be made while the slide track 80 is angularly positioned as it was to make the cut 154a, but in this case the entire dividing head will need to be moved along the slide bar 76 and possibly further adjustment of the guiding means 120 on the mounting bar 62 will be needed. Then in cutting the lines 154c and 154d, the slide track 80 will be rotated 90° from its position as shown in phantom in FIG. 1 so that the socket carrier 81 will move along a path to cut the lines 154c and 154d. The center section 155a of the blank will then fall out leaving the opening 154 cut therein. Thus, it is seen that rectilinear lines may be cut in any direction along predetermined measured paths by use of the dividing head attachment 36.

Figure 22:
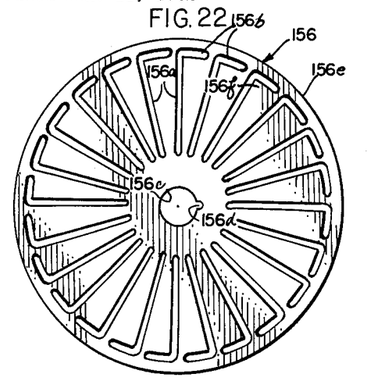
FIG. 22 is a plan view of an item cut by nibbling from a blank by use of the dividing head attachment without a template and illustrating that the dividing head can precisely and accurately regulate movement of the blank to define arcuate and rectilinear cuts therein.

An example of another precision design that may be cut in a blank by use of the dividing head attachment 36 is shown in FIG. 22 which shows a fan 156. The guide pin 129 is again set in the guide pin socket 119 on the socket carrier 81 in order to cut the fan 156. After the blank has been properly mounted on the upper carriage 35 and the guide pin 129 centered on the dividing head attachment 36 so that all of the cuts may be made on the blank to define the fan 156, it must be decided as to whether or not to follow one or two particular cutting procedures. For example, all of the radial lines 156a that are circumferentially spaced may be first cut, followed by the cutting of the arcuate lines 156b, or the arcuate lines 156b may be first cut and followed by the cutting of the radial lines 156a. Additionally, the center hole 156 must be cut out and a notch 156d is cut along the periphery of the center hole. Finally, the entire fan must be cut along the outer periphery and the line 156e to remove it from the blank. After the cuts have been made it can be appreciated that the portions 156f which are bounded by the cut 156a and 156b may be bent out of the plane of the fan to define the fan blades. The latter function is not one that is capable of being done by the machine of the present invention. Moreover, in making the radial cuts 156a, they may be made in succession circumferentially or may be made on opposite sides of the center opening 156c during a single rotational setting of the slide track 80. The latter procedure would probably be somewhat faster in that two radial cuts could be made during each rotational setting of the slide track 80. The length of the rotational cuts may be easily measured along the scale 108 on the slide track 80. In setting the dividing head attachment to cut the next successive radial lines, a measured degree of rotation may be accomplished in view of the degree scales 100 and 101. Inasmuch as it is desired to have 24 radial cuts spaced as shown equally, this means that they should be spaced at 15° from each other, and therefore the dividing head attachment will be adjusted so that the slide track 80 will be rotated in 15° increments in making the successive radial cuts. Similarly, when the arcuate cuts 156b are being made, the dividing head will be set so that the tool starts at one location, such as at the end of the radial lines 156a, and then the slide track 80 will be rotated on the dividing head attachment a predetermined number of degrees to give the desired length of the arcute cuts. For example, the arcuate cut may extend through a 10° arc and therefore 10° would be measured along either the degree scale 100 or the degree scale 101.

After the radial and arcuate cuts have been made, the center opening 156c may be cut in the same manner as was the center opening 152 in the blank 149. And then the notch 156d may be cut merely by a free-hand movement of the carriage 35. And then in cutting the fan 156 out of a blank along the line 156e, the procedure followed in cutting of the center hole 156c will be repeated wherein the radius of course is greatly increased by movement of the socket carrier 81 away from the center of the dividing head attachment. After each cut is made it should be understood that the nibbling tool would be raised out of cutting position until the blank is set for the next successive cut.

Figure 23:
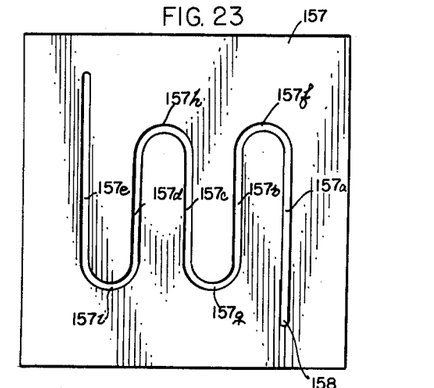
FIG. 23 is a plan view of another blank illustrating a still further design that may be cut by nibbling in a blank without the use of a template.

Another combination of rectilinear and curvilinear cuts in a blank is illustrated in the blank 157, FIG. 23, wherein rectilinear cuts 157a, 157b, 157c, 157d, and 157e are arranged parallel to each other and connected in snakelike fashion by curvilinear cuts 157f, 157g, 157h, and 157i. In cutting this particular design, the cutting may be started at one end or the other, such as at end 158. The dividing head would be adjusted so that the socket carrier 81 could be moved along the slide track 80 wherein the slide track 80 is positioned substantially parallel to the rails 54 supporting the lower carriage 34 so that the cut 157a can be made. After the straight cut 157a has been made, dividing head attachment 36 would be adjusted so as to make the curvilinear cut 157f by cutting the radius of the curvilinear line on the dividing head and rotating the slide track 80 through 180°. The rectilinear and curvilinear lines 157b, 157g, 157c, 157h, 157d, 157i, and 157e are successively made by following the same procedures. When a rectilinear line is made, the slide track 80 is locked in place so that it will not rotate, and when a curvilinear line is made, the socket carrier 81 is locked in place along the slide track 80 so that it cannot move while permitting rotation of the slide track 80 on the dividing head attachment.

Referring now particularly to FIGS. 18 to 21, the circle cutting attachment of the present invention, generally designated by the numeral 160, is illustrated and serves to primarily function for cutting circles by the nibbling tool in a blank. This circle cutting attachment is also mountable slidably and adjustably along the mounting bar 62 on the upper carriage 35. The attachment includes a supporting member 161 slidable along the mounting bar 62 and capable of being locked in any position therealong by means of the set screw 162. An indicator 163 is carried on the supporting member 161 and is adapted to coact with the measuring scale 125 in determining the position of the circle cutting attachment along the carriage 35 and where measured movements of the attachment are desired when the attachment is being set to perform a certain cut in a blank.

Upper and lower bosses 164 and 165 extend from the base 161 and are provided with bearing-lined aligned bores 166 and 167, respectively, for slidably and rotatably receiving a spindle 168. A collar 169 is received on the spindle 168 between the bosses 164 and 165 and locked in position by a set screw 170 to limit the vertical movement of the spindle. Thus, the spindle 168 is rotatably associated with the carriage 35 and also vertically slidable relative thereto within the limit of movement as defined by the collar 169.

The lower end of the spindle 168 is enlarged and provided with a track 171 for receiving an elongated, substantially square bar 172 in slidable relationship therewith. At one end of the bar 172 a pivot pin 173 is mounted and adapted to be received in a pivot socket, such as the socket 119, and the socket carrier 81 of the dividing head attachment 36. Graduations are provided along opposite sides of the elongated bar 172 to define a linear scale 174 which may be read through both eye windows 175 provided on each side of the enlarged lower end 176 of the spindle. A reference indicator 177 is arranged on the enlarged lower end 176 and adjacent the bull's-eye window 175 to coincide with the scale which can be read through the window. Thus, a measured distance between the pivot pin 173 and the axis of the spindle 168 may be read through the bull's-eye windows 175.

The spindle 168 is fixed along the elongated bar 172 by means of a combination set screw and drive shaft 178 which extends through the spindle 168 and is provided with a tip end 179 engageable with the topside of the elongated bar 174, and a threaded portion 180 threadedly received by the spindle. The upper end of the combination set screw and drive shaft is provided with a head 181 having a transverse bore therein which slidably receives a handle 182. A set screw 183 is threadedly received in the head 181 to selectively fasten the handle to the head. A knob 184 is provided on an upturned portion of the handle 182 for being grasped by the hand of the operator in operation of the circle cutting attachment.

Setting of the spindle 168 relative to the elongated bar 172 may be easily and quickly accomplished by loosening of the combination set screw and drive shaft by rotation thereof in a counterclockwise direction. After the bar 172 has been slid along the spindle to the desired location, clockwise rotation of the combination set screw and drive shaft 178 quickly tightens the set screw so that the tip end 179 engages the upper side of the bar 172 and locks the bar relative to the spindle. Then further clockwise rotation of the combination set screw and drive shaft drives the circle cutting attachment whereby the carriages 34 and 35 will be driven through a circular path as guided by the pivot pin 173. Thus, the circle cutting attachment may be quickly and easily set for various dimensions of circle radii.

While the circle cutting attachment 160 may be used in combination with the dividing head attachment for cutting certain designs and patterns in a blank, it may be also used only to cut circles, and in this instance a simple slide block 185 may be provided on the slide bar 76, wherein a socket 186 is mounted on the slide block to receive the pivot pin 173.

Figure 17:
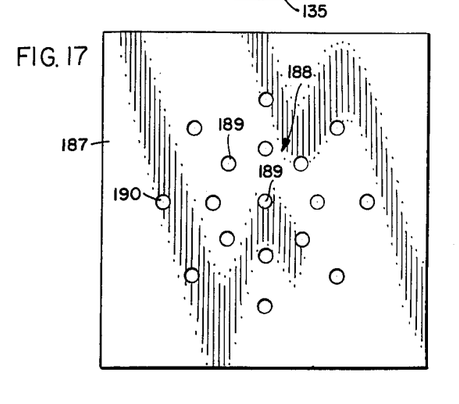
FIG. 17 is a plan view of a blank having holes therein formed by combined usage of the dividing head and circle cutting attachments of the invention.
Figures 18, 19:
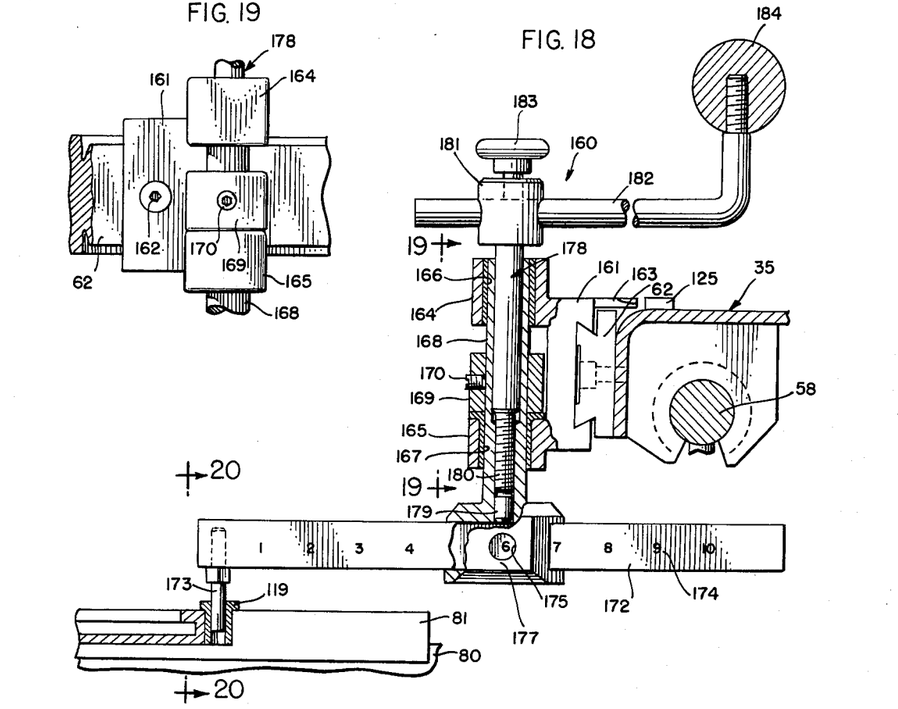
FIG. 18 is an elevational view of the circle cutting attachment according to the present invention with some parts in section and other parts broken away for purposes of clarity.
FIG. 19 is a detail front elevational view taken substantially along line 19—19 of FIG. 18.
Figure 20:
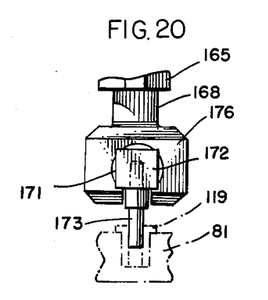
FIG. 20 is a detail elevational view taken substantially along line 20—20 of FIG. 18.
Figure 21:
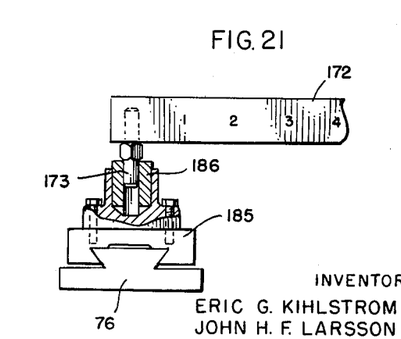
FIG. 21 is a detail fragmentary view, partially sectional, illustrating how the circle cutting attachment of FIG. 18 may be used in conjunction with the dividing head attachment.

A particular design that may be cut in a blank by combined use of the dividing head attachment 36 and the circle cutting attachment 160 is illustrated in FIG. 17 wherein a blank 187 is provided with a center hole 188, a first concentric series of holes 189 and a second concentric series of holes 190. Further, one hole in the outer concentric series of holes 190 is in alignment with one hole in the inner concentric series of holes 189. After the center hole 188 is cut, the socket carrier 81 to which the pivot pin 173 is pivotally connected may be moved away from the center on either side in order to cut the holes in the series 189 and 190 along one diameter. The slide track 80 may then be rotated a certain number of degrees to align the track along a diameter for cutting the adjacent set of holes in the series 189 and 190. At each setting, the handle for the circle cutting attachment will be rotated through 360° to cut out a hole. The other holes are cut successively by again rotating the slide track 80 through a predetermined number of degrees. Therefore, it can be seen that a number of different designs may also be cut in the blank through combined usage of the dividing head attachment and the circle cutting attachment and after a first blank has been cut with the holes, it may thereafter be used as a template for cutting further blanks with a like pattern.

A schematic illustration of the operation of the circle cutting attachment is shown in FIG. 26.

It will be understood that modifications and variations may be effected without departing from the scope of the novel concepts of the present invention, but it is understood that this application is to be limited only by the scope of the appended claims.

The invention is hereby claimed as follows:

1. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of co-ordinated two-dimensional movement relative to the material working tool and the frame, means on second carriage for securing a blank of material thereto, and guide means on said second carriage including a pin pivotally received by said frame, an elongated bar extending from said pin for movement through a plane parallel to the planes of movement of said carriages, and a shaft rotatably mounted on said second carriage about an axis extending perpendicular to said planes of movement, said shaft having means for adjustably securing it along said elongated bar, and rotatable attachment means capable of being rotated through at least 180° mounted on said frame coacting with said guide means to define regulated two-dimensional movement of said second carriage relative to said material working tool and said frame.

2. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of co-ordinated two-dimensional movement relative to the material working tool and the frame, means on said second carriage for securing a blank of material thereto, guide means on said second carriage, a first slide rail supported by said frame laterally of said first carriage and extending parallel to said first axis, and an attachment means rotatably mounted on said first slide rail and slidable along the length thereof and coacting with said guide means to define regulated two-dimensional movement of said second carriage relative to said material working tool and said frame.

3. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, guide means on said second carriage, a first slide rail supported by said frame laterally of said first carriage and extending parallel to said first axis, and an attachment means coacting with said guide means to define regulated two-dimensional movement of said second carriage relative to said material working tool and said frame, said attachment means including a base slidably carried on said first slide rail, means for selectively locking said base at any position along said first slide rail, a second slide rail rotatably carried on said base, means for selectively locking said second slide rail at any position rotationally of said base, means slidable on said second slide rail coacting with said guide means, and means for selectively locking said slidable means at any position along said second slide rail.

4. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, a guide pin adjustably mounted on said second carriage, a first slide rail supported by said frame laterally of said first carriage and extending parallel to said first axis, and an attachment means coacting with said guide pin to define regulated two-dimensional movement of said second carriage relative to said material working tool and said frame, said attachment means including a base slidably carried on said first slide rail, means for selectively locking said base at any position along said first slide rail, a second slide rail rotatably carried on said base, means for selectively locking said second slide rail at any position rotationally of said base, means slidable on said second slide rail coacting with said guide pin, and means for selectively locking said slidable means at any position along said second slide rail.

5. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, a guide pin adjustably mounted on said second carriage, a first slide rail supported my said frame laterally of said first carriage and extending parallel to said first axis, and an attachment means coacting with said guide pin to define regulated two-dimensional movement of said second carriage relative to said material working tool and said frame, said attachment means including a base slidably carried on said first slide rail, means for selectively locking said base at any position along said first slide rail, a second slide rail rotatably carried on said base, means for selectively locking said second slide rail at any position rotationally of said base, a block slidable on said second slide rail having a guide pin socket and means for mounting a template thereon for coacting with said guide pin, and means for selectively locking said slidable means at any position along said second slide rail.

6. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, a rail on said second carriage paralleling said second axis, a bracket slidable along said rail, means for selectively locking the bracket at any position along said rail, a guide pin carried by said bracket, a first slide rail supported by said frame laterally of said first carriage and extending parallel to said first axis, and an attachment means coacting with said guide pin to define regulated two-dimensional movement of said second carriage relative to said material working tool and said frame, said attachment means including a base slidably carried on said first slide rail, means for selectively locking said base at any position along said first slide rail, a second slide rail rotatably carried on said base, means for selectively locking said second slide rail at any position rotationally of said base, a block slidable on said second slide rail having a guide pin socket and means for mounting a template thereon for coacting with said guide pin, means slidable on said second slide rail coacting with said guide pin, and means for selectively locking said slidable means at any position along said second slide rail.

7. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, a guide pin adjustably mounted on said second carriage, a first slide rail supported by said frame laterally of said first carriage and extending parallel to said first axis, and an attachment means coacting with said guide pin to define regulated two-dimensional movement of said second carriage relative to said material working tool and said frame, said attachment means including a base slidably carried on said first slide rail, means for selectively locking said base at any position along said first slide rail, a second slide rail rotatably carried on said base, means for selectively locking said second slide rail at any position rotationally of said base, a scale on said base and indicator means on said second slide rail for measuring angular movement of said second slide rail, means slidable on said second slide rail coacting with said guide pin, and means for selectively locking said slidable means at any position along said second slide rail.

8. A material working machine comprising a frame, a material working tool carried on said frame, a first carriage reciprocably mounted on said frame for rectilinear movement along a first axis, a second carriage reciprocably mounted on said first carriage for rectilinear movement along a second axis perpendicular to said first axis, whereby said second carriage is capable of coordinated two-dimensional movement relative to the material working tool and the frame, means on said second carriage for securing a blank of material thereto, guide means on said second carriage including a guide pin, said guide means being adjustable along the length of said second carriage, a support member mounted on said frame, a slide rail mounted on said support member, rotatable attachment means mounted on said slide rail for rotational movement and longitudinal movement with respect thereto, and a socket member on said attachment rotatable therewith and movable rectilinearly with respect thereto, said socket member adapted to receive said guide pin, whereby a predetermined and regulated two-dimensional movement of said second carriage relative to said material working tool and said frame is made possible.

References Cited by the Examiner

UNITED STATES PATENTS

| 2,076,865 | 4/1937 | Romaine | 90—62 |
| 2,177,087 | 10/1939 | Akerlind | 83—413 |
| 2,409,290 | 10/1946 | Lipp | 90—62 |
| 3,058,380 | 10/1962 | Leibinger | 83—410 |

FOREIGN PATENTS 1,204,151  8/1959  France.

WILLIAM W. DYER, JR, *Primary Examiner.*

CARL W. TOMLIN, ANDREW R. JUHASZ, LEON PEAR, *Examiners.*